Jan. 16, 1940. G. GLOCKER 2,187,394
JAR
Filed June 21, 1938
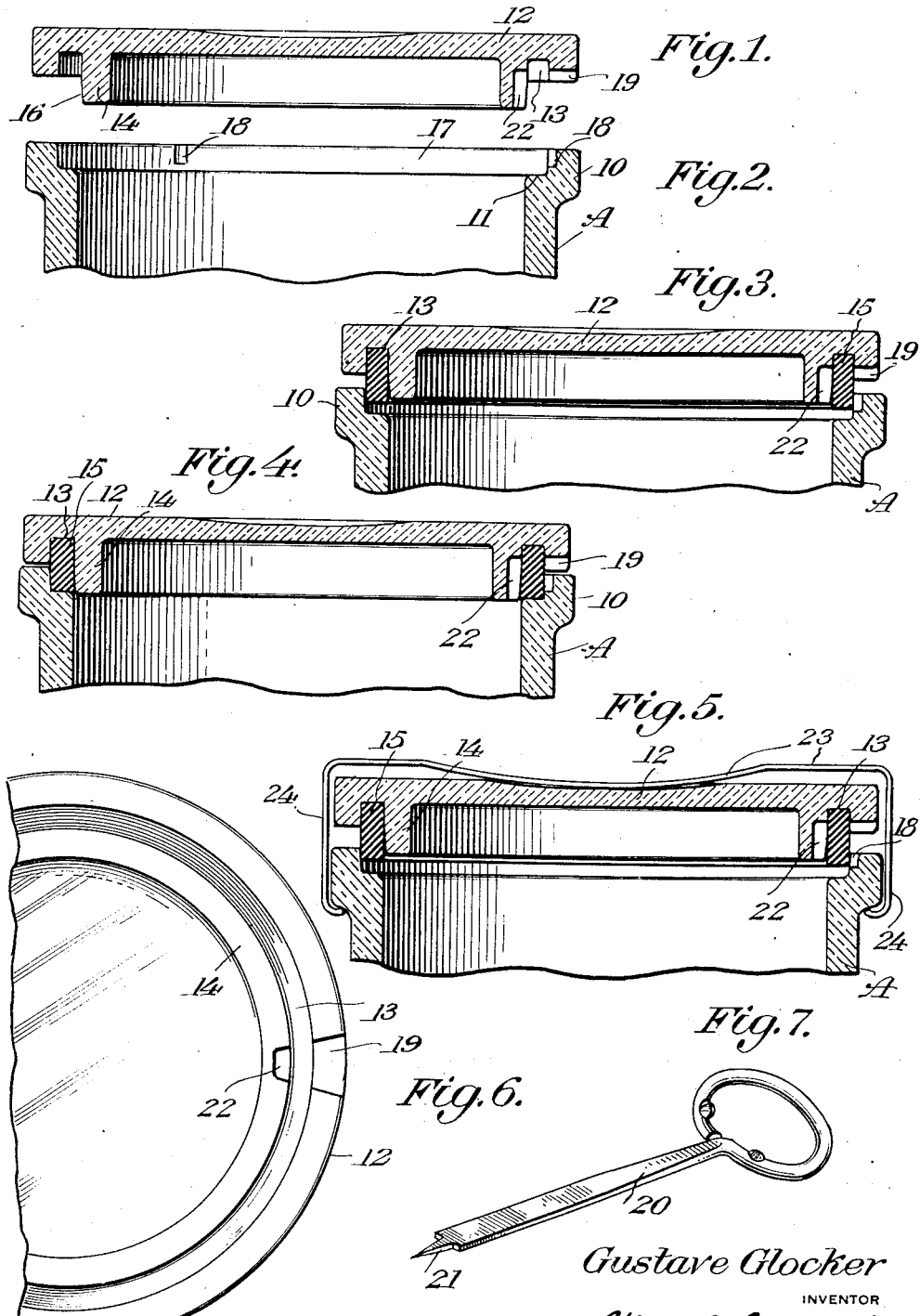
Gustave Glocker
INVENTOR
BY Victor J. Evans & Co.
ATTORNEYS Patented Jan. 16, 1940

2,187,394

UNITED STATES PATENT OFFICE 2,187,394

JAR

Gustave Glocker, Washington, D. C., assignor to Super-Seal Vacuum Glass Container Corporation, Washington, D. C., a corporation of Delaware Application June 21, 1938, Serial No. 214,982

5 Claims. (Cl. 215—40)

The invention relates to a jar and more especially to preserve jars having lid or cover seal.

The primary object of the invention is the provision of a jar of this character, wherein the lid or cover has fitted therein a rubber ring, the same being so arranged as to become seated interiorly of the jar body so as to effect a four-point seal with the lid or cover and said body at the joint between the same and at the same time affording a cushion for the lid or cover so as to avoid liability of breakage when the jars are stacked one upon the other or each is subjected to an external load.

Another object of the invention is the provision of a jar of this character, wherein the lid or cover will be clamped centered on the mouth end of the jar and pressure within the body of the jar will have escapement exteriorly thereof particularly when the jar with its contents is placed within a cooker and thus a self-sealing of the lid or cap will be assured when the jar and its contents cool without any liability of damage to the sealing ring or rubber.

A further object of the invention is the provision of a jar of this character, wherein the sealing ring or rubber can be readily punctured from without the jar so as to break or destroy the vacuum within the jar when sealed and thus permitting the easy and quick removal of the lid or cover from the jar after sealing thereof.

A still further object of the invention is the provision of a jar of this character, wherein the lid or cover is of novel construction so that it can be economically made and in association with a rubber or sealing ring will enable a positive and self-sealing of the jar and a four-point seal circumferentially of the jar at the joint between the lid or cover and the body of the jar is assured.

A still further object of the invention is the provision of a jar of this character, wherein the lid or cover can be conveniently and easily removed without necessitating the turning of the lid or cover on the body of the jar and the said lid or cover lifted from its seat for the opening of said jar.

A still further object of the invention is the provision of a jar of this character, wherein the lid or cover can be conveniently and easily placed upon the body of the jar and by external pressure thereon will become sealed in that any pressure within the jar will be let out therefrom so that the rubber or resilient ring can be positively seated and effecting a fluid-tight seal between the lid or cover and the body of the jar.

A still further object of the invention is the provision of a jar of this character, which is extremely simple in its construction, thoroughly reliable and effective in its operation, economically constructed, strong, durable, and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical sectional view through a lid or cover for a fruit jar constructed in accordance with the invention.

Figure 2 is a fragmentary vertical sectional view through the body of a fruit jar for the application of the lid or cover thereto.

Figure 3 is a fragmentary vertical sectional view through the body of the jar and the lid or cover, the said lid or cover being in initially placed position upon the open end of the jar.

Figure 4 is a view similar to Figure 3 showing the jar sealed with the lid or cover applied.

Figure 5 is a view similar to Figure 4 showing the application of a spring clip or clamp to the jar and the lid or cover therefor.

Figure 6 is a fragmentary bottom plan view of the lid or cover.

Figure 7 is a perspective view of a key for use in the removal of the lid or cover from the jar.

Similar reference characters indicate corresponding parts throughout the several views in the drawing.

Referring to the drawing in detail, A designates generally a portion of the body of a jar, preferably of the glass type and having as usual the open mouth which is formed with an outstruck annular rim 10 having an internal countersunk annular shoulder 11 providing a seat within the mouth or open end of said jar. This mouth or open end of the jar is adapted to be closed by a removable lid or cover 12 which is of a diameter slightly smaller than the external diameter of the rim 10 of the body of said jar and formed in the bottom face of said lid or cover 12 is an annular groove or channel 13 which is adapted to register with the countersunk shoulder 11 in the rim 10 while inwardly of this channel or groove 13 and depending from the bottom face of the lid or cover is an annular backing wall 14 for a resilient sealing ring or rubber 15 which is fitted within the groove or channel 13 and is adapted for contact with the shoulder 11 in the mouth or open end of the body A of the jar for effecting a seal between the lid or cover and said jar.

The ring or rubber 15 is relatively deep and has a width corresponding to the width of the channel or groove 13 and by the presence of the rim 10 on the body of the jar and the wall 14 on the lid or cover a four-point contact of this ring or rubber 15 will be had therebetween and at the same time an overlap is assured with respect to the joint between the lid or cover and the body A of the jar so that a perfect fluid-tight seal is had therebetween.

The external surface of the wall 14 next to the outer edge thereof and outside of the groove or channel 13 is beveled at 16 so as to permit a spreading or expanding of the ring or rubber 15 when external pressure is brought to bear upon the lid or cover on the contacting of the ring or rubber 15 with the shoulder 11 when fitting the lid or cover to the jar and in this manner augmenting the sealing action by the ring or rubber 15 when the lid or cover is in its final applied position.

Provided in the vertical inner wall 17 of the rim 10 and slightly upwardly removed from the shoulder 11 are pressure escapement notches 18, these opening through the upper edge of the rim 10 so that when the lid or cover 12 has been placed upon the jar A this internal pressure can freely vent or escape exteriorly thereof and thus relieve any resistance to the sealing of the lid or cover upon the jar.

Opening through the outer periphery of the lid or cover 12 is a horizontal key way 19, which is outside of the wall 14 and in the bottom face of said lid or cover for intersecting the channel or groove 13 to give access to the ring or rubber 15 so that by the use of a key 20 with a punch tip or spur 21 when inserted in the key way 19 will enable the puncturing of the rubber or ring 15 and thus break or destroy the vacuum interiorly of the jar when the lid or cover is sealed thereon. Thereby the said lid or cover 12 can be readily and easily removed from the jar A for the opening thereof. This way 19 has the vertical passage 22 opening downwardly in the lid or cover 12 for communication with the interior of the jar to allow the flow of compressed air or the breaking of the vacuum interiorly of the jar when the ring or rubber 15 has been punctured in a manner as before set forth.

The key 20 is manually manipulated and on insertion within the way 19 and thereafter by external pressure upon the key the punch tip or spur 21 will readily puncture the rubber or ring, the latter being backed by the wall 14 excepting at the passage 22 and thus the tip 21 will freely pierce such ring or rubber.

Straddling the lid or cover 12 and engaged beneath the rim 10 of the jar A is a spring clip or clamp which involves a downwardly bowed springy intermediate portion 23 and downturned hook-like terminal legs 24. This clamp or clip when bridging the lid or cover permits a rise of the latter from the jar when within a cooker so as to permit the automatic escape of pressure within the jar through the notches 18 and thus relieving any resistance of the lid or cover becoming sealed upon the jar during the cooling of the contents thereof and a four-point seal of the ring or rubber 15 will take place between the lid or cover and the said jar by vacuum sealing action.

While there has been mentioned the use of a key for puncturing purposes of the ring or rubber, it is to be clearly understood that any implement susceptible of puncturing can be substituted for this key.

By reason of the formation of the wall 14 and its relationship to the body mouth rim 10 with respect to the seat 11 when the cover or lid has been finally applied to the jar the contents of the jar are prevented from contact with the rubber or ring 15 and in this manner the longevity of the latter is assured as well as eliminating any possibility of contamination.

The mouth rim 10 has a flat upper edge and likewise the outer peripheral portion of the lid or cover 12 at the under face thereof is flattened and when this lid or cover is finally in sealing position upon the body of the jar the upper edge of the rim 10 will constitute an abutting table for the lid or cover so that there can not possibly be any rocking action to this lid or cover which would have a tendency to break the seal or cause such lid or cover to become loosened upon the jar. In other words, this lid or cover when in final vacuum sealing position will be held true upon the jar without any liability whatever of a breaking of its seal excepting by extraction of such lid or cover from sealing position when intended to do so.

What is claimed is:

1. A jar of the kind described comprising a body closed at its bottom and open at its top, an annular rim at the open top and having a countersunk internal annular shoulder forming a seat, a lid for said open top and having in its bottom an annular groove inset from the outer peripheral edge thereof for registering with the shoulder, an annular backing wall depending from the bottom of said lid inwardly of said groove, a resilient sealing ring engaged in said groove for contact with the shoulder and having four-point contact with the body and lid and completely bridging the joint between the lid and body, the said rim at the inner wall thereof having a vent opening through the top edge of said rim and communicative with the interior of the body for escapement of fluid under pressure within the body when the lid is applied thereto, the said lid having a key way intersecting the path of the sealing ring for communication with the vent and accessible exteriorly of the jar for the insertion of a punch and puncturing of said ring to break vacuum within the body and easy removal of the lid when sealed thereon, and a tensioning clamp bridging the lid and releasably engaged with the rim exteriorly thereof.

2. A container comprising a body having a mouth therein provided with pressure escapement notches opening outwardly thereof from the internal surface thereof, a sealing member therefor, the internal surface at said mouth adapted to be engaged by the outer surface of said sealing member with the notches covered by the latter, a lid for said mouth and having a groove in the lower surface inset from the outer peripheral edge thereof for receiving an edge of said sealing member and also seating the latter, and a backing member depending from said lid inwardly of said groove adapted to be contacted by the inner surface of said sealing member to provide a support therefor through a major portion of its area and having a passage permitting the insertion of a piercing tool and registering with one of the notches.

3. A container comprising a body having a mouth therein provided with pressure escapement notches opening through the inner surface and outwardly thereof, an internal surface at said mouth adapted to be engaged by the outer surface of a sealing member with the notches covered by the latter, a lid for said mouth and having a groove in the lower surface inset from the outer peripheral edge thereof adapted to seat a sealing member, and a backing member depending from said lid inwardly of said groove adapted to be contacted by the inner surface of a sealing member and having a passage permitting the insertion of a piercing tool and registering with one of the notches.

4. A lid for an open mouthed container comprising a body portion having in its bottom an annular groove inset from the outer peripheral edge thereof for receiving and snugly engaging a relative narrow edge of a sealing member, a sealing member having a relatively narrow edge seated in said groove, a backing member depending from said lid adapted to support the inner side of said sealing member through a major portion of its area, and a lateral key way intersecting the backing member at a point in said lid spaced from the bottom of said groove to permit the passage of a piercing key through said sealing member.

5. A lid for an open mouthed container comprising a body portion having in its bottom an annular groove inset from the outer peripheral edge thereof for receiving and snugly engaging a relatively narrow edge of a sealing member, a sealing member having a relatively narrow edge seated in said groove, a continuous backing member depending from said lid adapted to support the inner side of said sealing member through a major portion of its area, a passage opening downwardly from said lid formed by said depending backing member, and a lateral key way in said lid intersecting the backing member at a point directly in front of said passage and spaced from the bottom of said groove to permit the passage of a piercing key through said sealing member.

GUSTAVE GLOCKER.